UNITED STATES PATENT OFFICE.

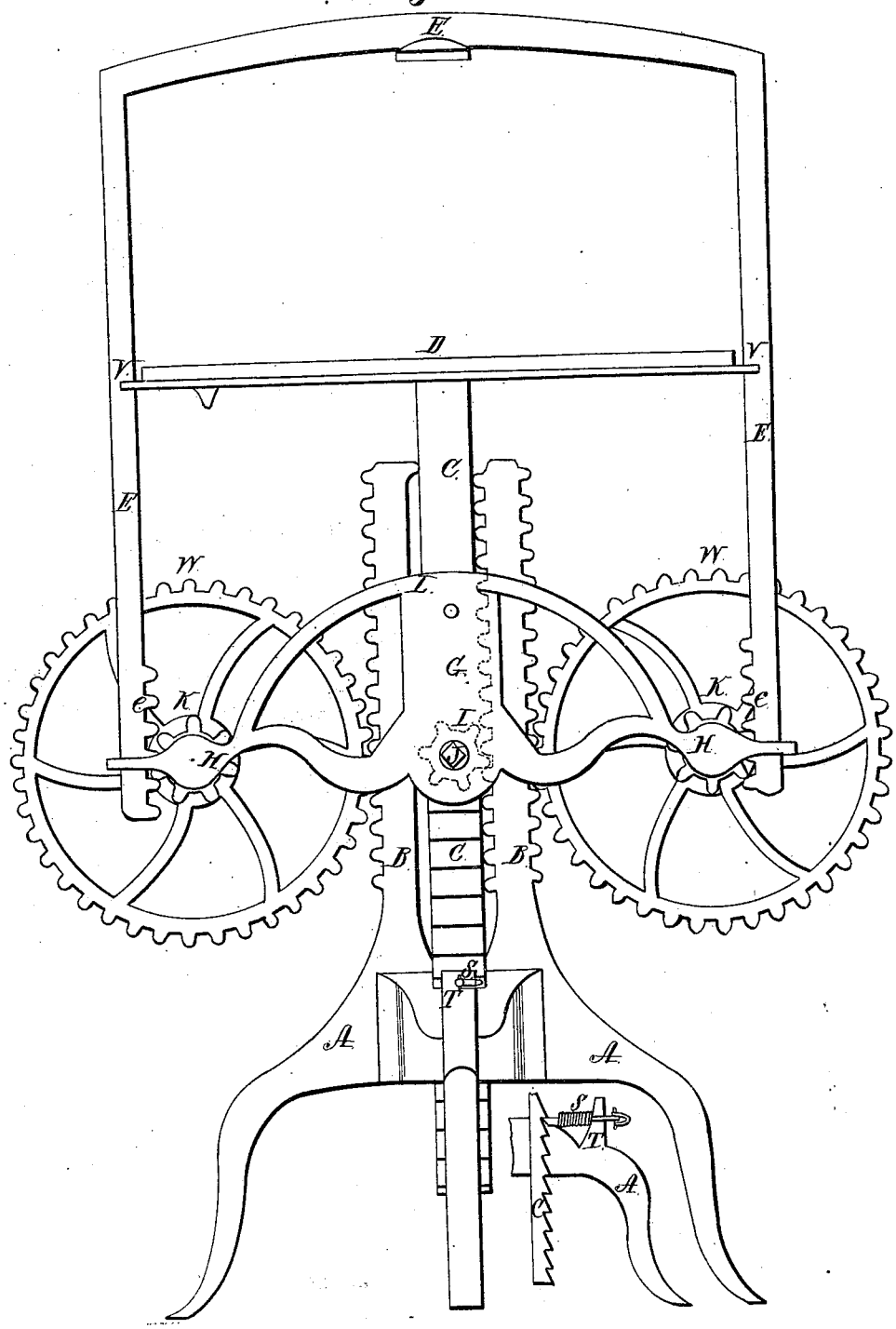

IRA CARTER, JR., OF PLATTSBURG, NEW YORK.

SELF-ACTING CHEESE-PRESS.

Specification of Letters Patent No. 6,641, dated August 14, 1849.

*To all whom it may concern:*

Be it known that I, IRA CARTER, Jr., of Plattsburg, in the county of Clinton and State of New York, have invented a new and useful machine named a Cheese-Press; and I do hereby declare that the following is a full, clear, and exact description.

The nature and principle of my invention consists in providing a movable elevating cheese table and combining it with a cross head lever having racks at the ends of its arms, and by the peculiar combination of pinions and wheels. I am enabled to suspend the whole weight of the cheese table on the ends of the levers, and gradually decrease the space between the cross head of the lever and cheese table, so as to press cheese curd, or cheese, that may be placed on the cheese table, by the lever bearing downward on the same by the weight of the cheese table and its appendages, suspended on the ends of the lever.

To enable others skilled in the art to make and use my invention I will proceed to describe its construction and operation reference being had to the accompanying drawings making a part of this specification, in which—

Figure 1, is a front elevation and Fig. 2, a side section view.

A, A, is a stout metal frame, which I prefer, for economy to be of cast iron. It has four legs, but may be made of any other form for convenience and solidity.

B, B, are two upright rack bars forming part of the frame and cast along with the legs in one piece. The bars may be made from eighteen inches to two or three feet high. They are about from three to six inches broad and from one to two inches thick according to the size of the press desired. These two parts of the frame may be cast separate or in one piece,—they are fixed and stationary.

C, C, is an upright table standard. It is broad and thin and of such width as to move freely between the rack bars B, B—it is held snugly between the bars by moving in a groove, if required, made at or in the top of one of the bars. On the lower part of the standard there is cut or cast a wedge rack into which a spring wedge may be inserted to hold up the standard at any point, in the manner represented by Fig. 2.

S, is the spring wedge and T, the upraised butt or fulcrum to hold the wedge in its place.

D, is the cheese table, it is a circular plate of the shape of a cheese and on which the cheese basket for pressing the curd in, is to be placed. It is secured firmly by a bottom flange, and rivets or bolts to the standard.

G, is a broad metal bearing with arms for the axles of the pinion and wheels to rest and move in.

H, H, are the arms for the pinions K, K, and the wheels W, W, to rest upon by their axles resting and moving, as required in proper bearings.

L, is a metal bow cast all in one piece with G, and H, H, for to make all strong and firm. On the other side of the cheese press made and secured in the same manner, there is placed the duplicate of G, H, H, to make all secure, strong and firm. This part just described G, H, H, and the wheels and pinions are all firmly joined to the standard and the cheese table by a bolt X, passing through the standard C and securing it to both bearings—the front and back.

E, E, E, is a cross head lever with a rack on the interior part of each extremity represented by e, e. This lever is held firm to mesh by the racks into the pinions K, K, by the ends of the bearings being made to clamp or hold in the ends of the lever to the pinions.

I, is a pinion, seen in section working under G, into the inside rack of B.

J, is an axle of the interior pinion, and is operated by a crank handle. This handle passes through to the other side of the press. As this pinion is turned by the handle moving the axle, the table and platform are elevated by the pinion biting into the interior rack, and the action of the wheels W, and pinion K, and their respective racks causes the cross head lever to be lifted faster than the cheese table—the space between the block E, of the lever and the cheese table increasing as the platform is elevated; and from the same causes, the same space decreasing as the platform is lowered. The cheese to be pressed is placed upon the table when the table is at is greatest elevation, and the spring wedge T, is then taken out of the rack, when the table will descend gradually, the space decreasing between the table and the cross head, as the cheese is being compressed. By this combination of the racks and pinions, the principle of power applied to the cross head lever, is developed in a manner not hitherto known or used for the same purpose, viz by the weight of the cheese table, wheels and pinions, and the pinion plates and bearings being suspended or applied to press the cheese at, or near the extremities of the lever.

The arms of the lever are held steady by two clasps V, V, on the cheese table and which keep them from springing out also. The whole machine is made of cast iron, and may be said to be composed principally of these several parts viz, the legs or frame and racks B, B, the cross head lever, and the other appendages as described. The frame is stationary, but the cross head lever, pinions, wheels and cheese table are movable.

Having thus described my invention I claim—

The cross head lever E, E, constructed with the racks e e as described, in combination with the cheese table D, and the stationary racks B, B, by means of the wheels W, W, and the pinions K, K, operated by the pinion J, in the manner herein represented, for the purpose of elevating the cheese table, and the cross head lever, but especially for exerting a continual, self acting pressure upon the cheese, by the space between the cross head and the cheese table decreasing as the cheese is being compressed, substantially as herein represented and described.

IRA CARTER, Jr.

Witnesses:
ADDISON BURR,
HENRY CARTER, Sr.